C. A. HIRTH.
MACHINE BEARING.
APPLICATION FILED JAN. 14, 1915.
1,244,090.
Patented Oct. 23, 1917.
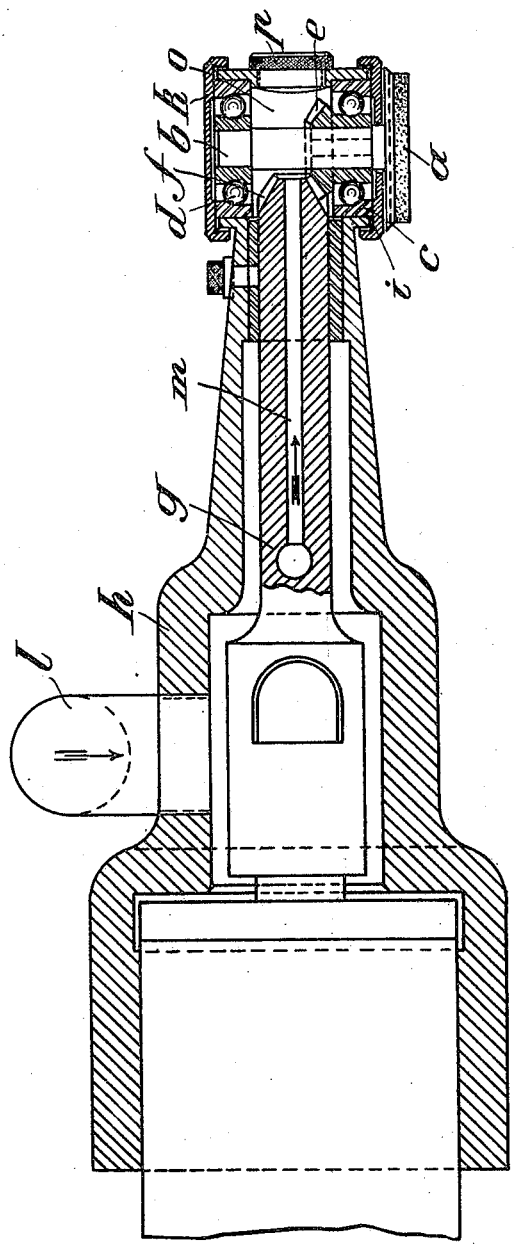
Witnesses
Marguerite Schaup
Isabel Morris.
Inventor
Carl Albert Hirth
by [signature]
his Attorney

UNITED STATES PATENT OFFICE.

CARL ALBERT HIRTH, OF STUTTGART-CANNSTATT, GERMANY, ASSIGNOR TO FORTUNA-WERKE, SPECIALMASCHINENFABRIK, G. M. B. H., OF STUTTGART-CANNSTATT, GERMANY.

MACHINE-BEARING.

1,244,090.   Specification of Letters Patent.   Patented Oct. 23, 1917.

Application filed January 14, 1915. Serial No. 2,205.

*To all whom it may concern:*

Be it known that I, CARL ALBERT HIRTH, of 34 Pragstrasse, Stuttgart-Cannstatt, in the Kingdom of Wurttemberg, German Empire, have invented certain new and useful Improvements in Machine-Bearings, of which the following is a specification.

My invention relates to a system for protecting machines and more especially the rotating or reciprocating parts of high-speed machinery against the pernicious action of dust. It is well known that the shafts and other parts of a machine running at high speed, as well as their bearings, and more especially the ball bearings nowadays extensively used in such machines are constantly menaced by the dust collecting within the machine shop. In the case of grinding and other machinery producing such dust in great quantities this danger is greatly enhanced. Up to this day, however, it has been impossible to efficiently protect the moving parts of such machinery against the dust entering from outside into the bearings and so on. The usual means applied for rendering them dust-proof are apt to cause additional friction and wear, and as soon as the moving parts are worn out to a certain degree, the dust entering between the stuffing box and the shaft will cause a rapid increase of wear. Oil does not prevent the dust from passing through and is moreover apt to form with it a thick paste further increasing the wear of the moving parts.

The object of my invention is a system of protection of all such parts against the action of dust, and it is specially applicable to and useful for bearings and gear systems of high-speed machine-tools producing great quantities of dust, such as for instance grinding machines. My new system consists in general in creating within the chamber surrounding the ball-bearing or the like to be protected against dust and air pressure superior to the pressure of the air within the space containing the dust. Independently from the means used for creating such an increased pressure and from conducting the air into and out of the bearing chamber the current of compressed air should flow in a direction toward the dust and should continuously sweep the balls and races of the ball-bearing to be protected. It is easy to see that this new system has the great advantage of creating no additional friction whatever.

In the drawing annexed to this specification the new system is shown as applied to a grinding machine.

$a$ is an exchangeable grinding wheel, $b$ is the journal carrying the wheel and supported by two ball-bearings $c$ and $d$. A miter wheel gearing $e$ $f$ for rotating the journal $b$ and wheel $a$ is driven by a spindle $g$. The ball-bearings are supported by a bushing $h$ surrounding the spindle $g$, the free end of said bushing forming a chamber $o$ containing the bearings $c$ $d$ and the gearing $e$ $f$ and being closed by caps $i$ $k$ $p$.

An air pipe $l$ connects the bushing $h$ and, by means of a longitudinal canal $m$, also the chamber $o$ with a compressed air reservoir, an accumulator, a blower or the like, thereby creating an increased air pressure within said chamber. At all points of said chamber which are not absolutely tight and might therefore allow dust to enter, the compressed air will escape and thereby prevent the dust from entering.

In the machine shown in the drawings the compressed air is free to pass between the gear wheels $e$ $f$ and the balls of the bearings $c$ $d$ through the ring-shaped gap between journal $b$ and cap $i$, this gap being preferably made as narrow as possible.

A special feature of my invention is a new mode of lubricating the parts protected against the action of dust, said lubrication being caused by a lubricant such as oil or graphite or the like admixed to the compressed air in a state of fine division. The lubricant thus introduced into the chamber $o$ in the form of a veil will be deposited most evenly upon the balls and races and will lubricate them most effectively, its quantity however being kept so low as to offer the form of lubrication most advantageous for parts moving at high speed.

I claim:—

1. The method of protecting from dust, delicate parts of high speed machinery, such as ball bearings operating in the air while avoiding the use of ordinary packings, which comprises maintaining compressed air within the space in which such parts operate, at a pressure in excess of the surrounding outside pressure, whereby any flow of air which may occur will occur outwardly from the space within which such parts operate.

2. The method of lubricating and protecting from dust the operating parts of delicate machinery which comprises adding finely divided lubricating material to compressed air, passing the compressed air containing said lubricating material into a space within which the parts operate, and maintaining in said space a pressure higher than the surrounding atmospheric pressure whereby a flow of air outward from said space is caused to prevent entrance of dust into the operating space.

In testimony whereof, I affix my signature, in presence of two witnesses.

CARL ALBERT HIRTH.

Witnesses:
ANTON ARETZ,
FRIDA KLAIBER.